H. T. THOMAS.
ENGINE STARTER.
APPLICATION FILED DEC. 8, 1915.
1,205,059.
Patented Nov. 14, 1916.
4 SHEETS—SHEET 1.
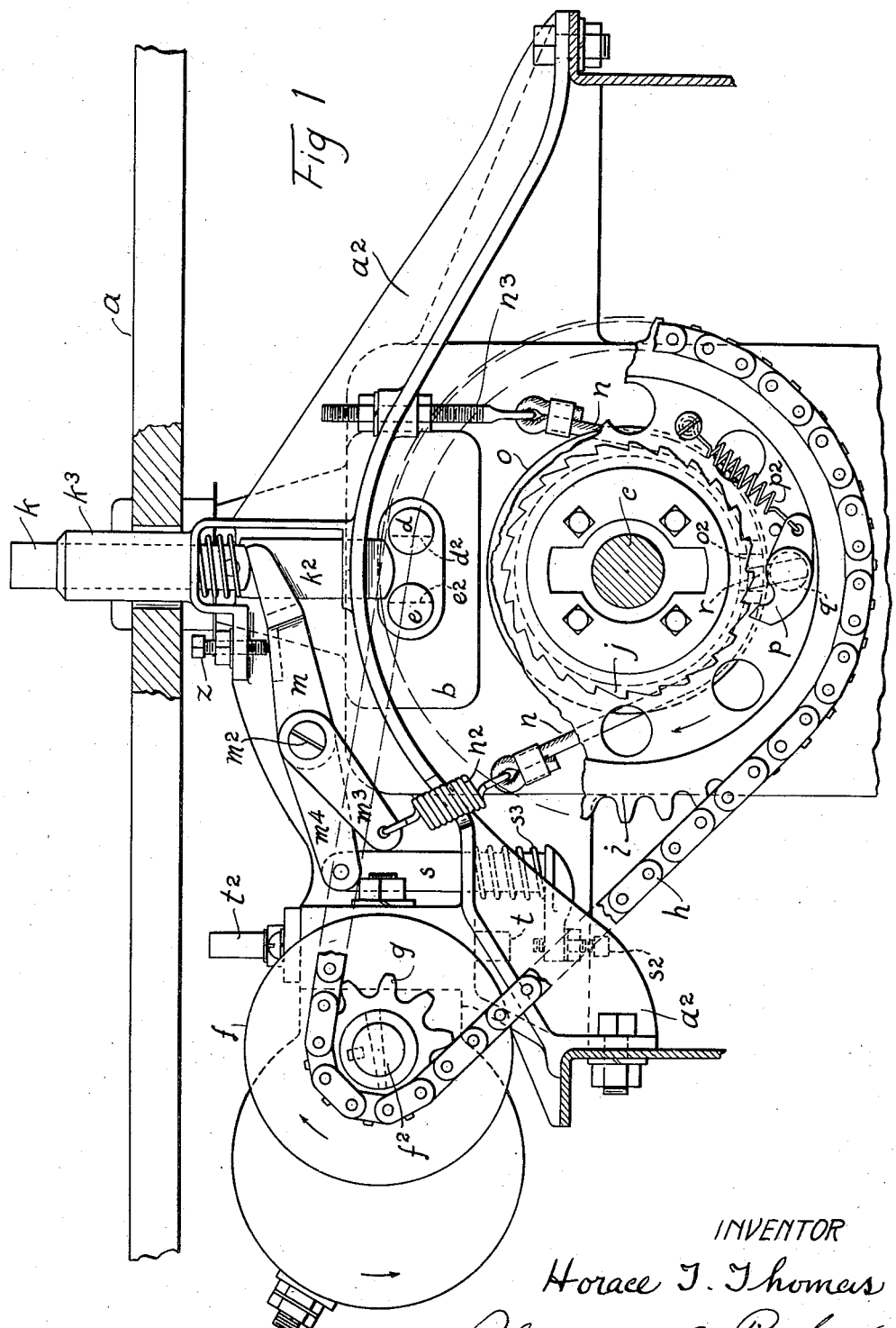
INVENTOR
Horace T. Thomas
BY Rahzemond A. Parker
ATTORNEY

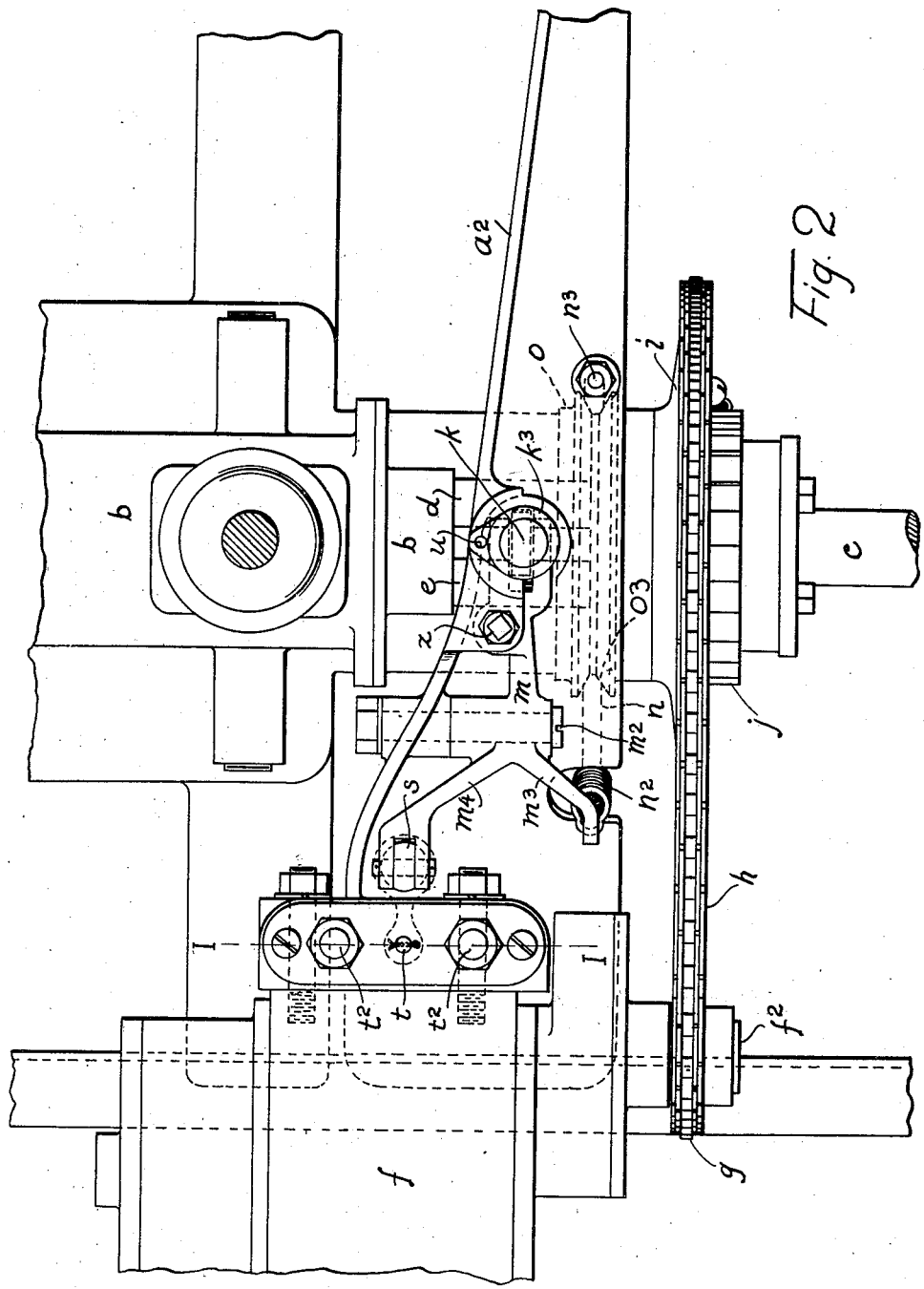

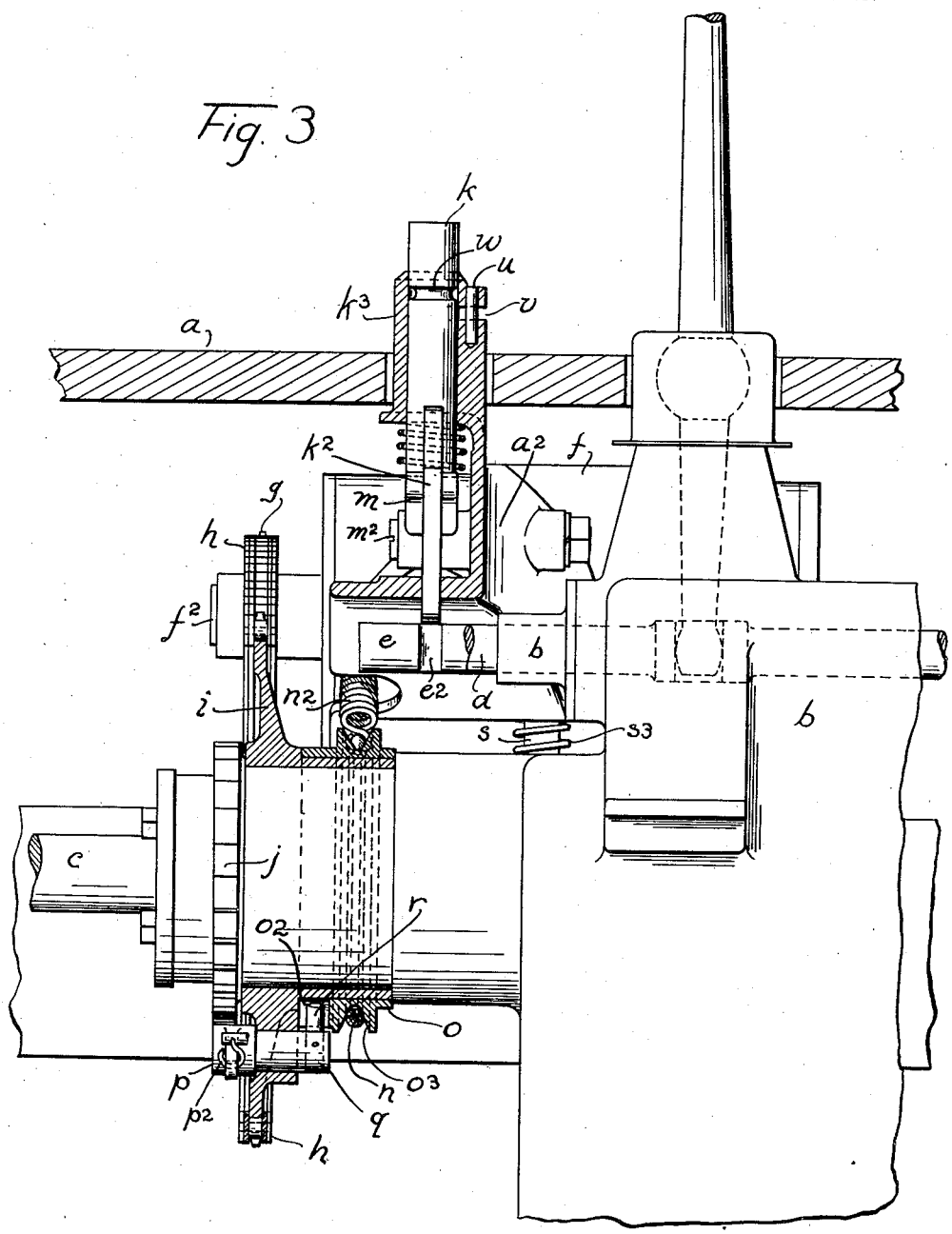

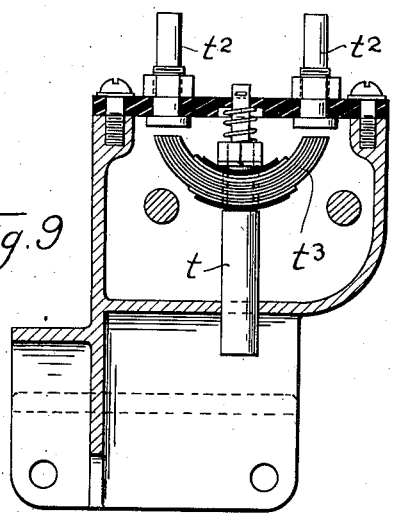
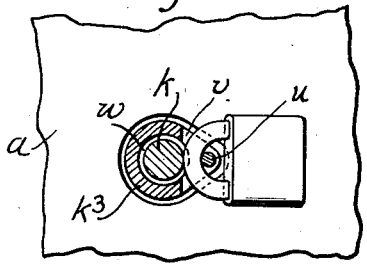
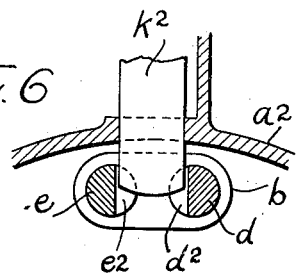
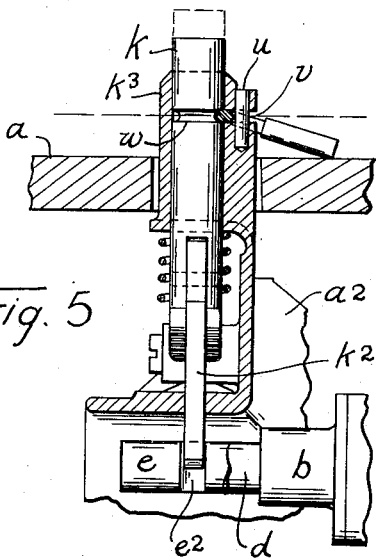
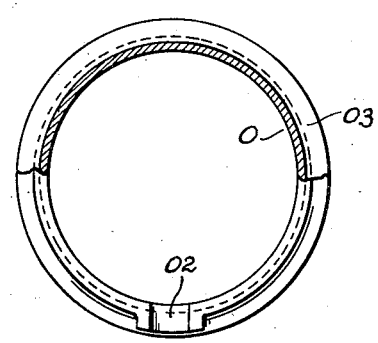
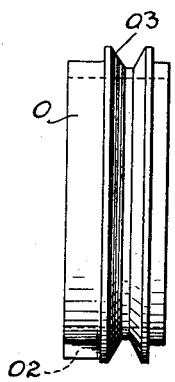

UNITED STATES PATENT OFFICE.

HORACE T. THOMAS, OF LANSING, MICHIGAN.

ENGINE-STARTER.

1,205,059.

Specification of Letters Patent.

Patented Nov. 14, 1916.

Application filed December 8, 1915. Serial No. 65,649.

*To all whom it may concern:*

Be it known that I, HORACE T. THOMAS, a citizen of the United States, residing at Lansing, county of Ingham, State of Michigan, have invented a certain new and useful Improvement in Engine-Starters, and declare the following to be a full, clear, and exact description of the same, such as will enable others skilled in the art to which it pertains to make and use the same, reference being had to the accompanying drawings, which form a part of this specification.

My invention relates to engine starters and an object of my improvements is to provide an improved actuating apparatus and one which will act to lock the change speed gearing in neutral position and which affords a means for securing the operative mechanism of an automobile from unauthorized interference. I secure this object in the device illustrated in the accompanying drawings in which, Figure 1 is an elevation of an apparatus embodying my invention, and so much of an automobile as is necessary to show its connection therewith. Fig. 2 is a plan view of the same. Fig. 3 is an elevation partly in section looking from the right of Fig. 1. Fig. 4 is a detail plan view partly in section. Fig. 5 is a detail sectional elevation. Fig. 6 is a detail sectional elevation looking from the left of Fig. 5, the section being on the line F—F Fig. 5. Fig. 7 is a detail view of the actuating ring partly in section. Fig. 8 is an elevation looking at the edge of the ring shown in Fig. 7. Fig. 9 is a detail sectional elevation showing the switch for throwing in the starting motor, the plane of section being indicated by the line I—I Fig. 2.

$a$ is the floor of the body of an automobile; $b$ is the change-speed-gearing casing; $c$ is the engine shaft; $d$ and $e$ are rods connected to the adjusting mechanism of the change speed gearing and extending through the wall of the casing $b$ parallel to each other.

$d^2$ $e^2$ are slots cut vertically in adjacent sides of the rods $d$ and $e$.

$f$ is a starting motor.

$f^2$ is the shaft to the motor $f$.

$g$ is a sprocket wheel on the shaft $f^2$.

$i$ is a sprocket wheel journaled so as to normally turn freely around and concentric with the shaft $c$.

$h$ is a sprocket chain passing over the wheels $g$ $i$ and engaging their teeth.

$j$ is a ratchet wheel rigidly secured upon the shaft $c$.

$p$ is a pawl pivoted upon the sprocket wheel $i$ adapted to engage the teeth of the ratchet wheel $j$ and normally held out of engagement with said teeth by a spring $p^2$.

$o$ is a ring sleeved upon the hub of the wheel $i$ and adapted to have some angular motion relative to said wheel. The ring $o$ is provided with a groove $o^3$ around its periphery and with a slot $o^2$ in its periphery at one side.

$q$ is a shaft upon one end of which the pawl $p$ is secured. Said shaft extends through the web of the wheel $i$ and is pivoted therein.

$r$ (Fig. 3) is an arm extending from the end of the shaft $q$ opposite to that upon which the pawl $p$ is secured and engaging eccentrically in the slot $o^2$ of the ring $o$. The engagement of the arm $r$ in the slot $o^2$ normally causes the rotation of the ring $o$ with the wheel $i$.

$k$ is a rod adapted to reciprocate vertically in a socket $k^3$ secured upon the floor $a$.

$a^2$ is a bracket by which the mechanism is secured in place.

$k^2$ is a flat blade or bolt pivoted to the lower end of the rod $k$ and extending downward in line with said rod.

When the change-speed-gearing is in neutral position the rods $d$ and $e$ have such relative position that the slots $e^2$ and $d^2$ are opposite each other and directly below the blade or bolt $k^2$ extending from the rod $k$. The bolt $k^2$ engages in a slot in the web of the bracket $a^2$ adjacent to the rods $d$ and $e$. When the rod $k$ is depressed the bolt $k^2$ engages in the slots $e^2$ and $d^2$ and thereby holds the change-speed-gearing in its neutral position.

$m$ is a lever pivoted at $m^2$, and having one end engaging under the lower end of the rod $k$ and holding said rod normally in its elevated position, as shown in Fig. 1. The lever $m$ has two branches $m^3$ and $m^4$. To the end of the branch $m^4$ there is pivoted a vertical rod $s$ which reciprocates through an opening in the web of the bracket $a^2$.

$s^3$ is a spring pressing downward upon the rod $s$ and thereby acting to hold the end of the lever arm $m$ which is under the rod $k$ in its elevated position. The upward travel of the lever arm $m$ is adjusted by a set screw $z$.

There is a set screw $s^2$ carried by an arm extending from the lower end of the rod $s$ which set screw is adapted to contact a rod $t$ to press said rod upward and force the contact piece $t^3$ (Fig. 9) into connection with the contact pieces $t^2$ $t^2$ so as to complete the circuit through the electric motor. From the arm $m^3$ extending from the lever $m$ there is a brake band $n$ which in the mechanism shown is cylindrical and engages in the V-shaped slot $o^3$ on the ring $o$. The band proper is connected to the arm $m^3$ by a helical spring $n^2$. The other end of said band is connected to the bracket $a^2$ by an adjustable screw $n^3$ (Fig. 1).

The operation of the above described device is as follows: When it is desired to start the engine the change-speed-gearing is placed in neutral position with the slots $e^2$ and $d^2$ of the rods $e$ and $d$ opposite each other and directly beneath the blade or bolt $k^2$ extending downward from the rod $k$. The operator then presses the rod $k$ down with his foot, the bolt $k^2$ engaging in the slots $e^2$ $d^2$ and upon further motion rocking the lever arm $m$ until the rod $s$ is drawn so high that it has come in contact with the rod $t$ and actuates said rod to close the switch of the motor. Thus, the motor is set in motion driving the gear wheel $i$ through wheel $j$ and chain $h$, the brake band $n$ being brought forcibly into engagement with the walls of the groove $o^3$ of the ring $o$, retards such ring in its motion which acts against the arm $r$ to rock the rod or shaft $q$, and turn the pawl $p$ into position to engage a tooth of the ratchet wheel $i$, which latter is rigidly secured upon the shaft $c$ and thus the shaft $c$ is actuated to start the engine. If an explosion should occur in the engine before it has reached its upper center, the mechanism may turn backward without bringing much strain upon the operator's foot inasmuch as the ring $o$ can turn against the frictional resistance of the brake band $n$. I have cut an annular groove $w$ in the periphery of the rod $k$ (Figs. 3 and 5) and in the socket or guide piece $k^3$ I have cut a slot $v$ which is bordered by two lugs extending outwardly from said socket or guide piece. I have placed a vertical pin $u$ through said lugs passing across said slot. When the groove $w$ comes opposite the groove $v$, the bolt $k^2$ is engaged in the slots $e^2$ $d^2$ but the switch is not yet engaged to complete the circuit through the motor. In this position I engage a hasp of a padlock through the slot $v$ and around the pin $u$, said hasp also extending into the groove $w$ in the rod $k$. Thus, the change-speed-gearing is locked in its neutral position and the starter actuating mechanism is locked in an inoperative position and the apparatus is secure from unauthorized interference. The spring $n^2$ is made of such proportion that when the lever arm $m$ is actuated it shall bring a sufficient but not excessive pressure between the brake brand $n$ and the walls of the slot $o^3$ of the ring $o$ and this spring may yield in case of a reverse movement of the mechanism.

I have described and claimed the specific apparatus for engaging the starting motor with the engine shaft in a co-pending application.

What I claim is:

1. The combination of a change-speed-gearing, a starting mechanism, means for successively locking said change-speed-gearing in its neutral position and then setting said mechanism in operation, and means for fastening said locking means in position after it has locked the change-speed-gearing in its neutral position and before it has set the motor in motion.

2. The combination of a change-speed-gearing, having two moving parts for adjusting said gearing, slots in the adjacent sides of said adjusting parts, a reciprocating bolt adapted to engage said slots when the change-speed-gearing is in neutral position, a starting mechanism, and means for setting said mechanism in operation adapted to be actuated with the movement of said bolt.

3. The combination of a change-speed-gearing having two moving parts for adjusting said gearing, slots in the adjacent sides of said adjusting parts, a reciprocating bolt adapted to engage said slots when the change-speed-gearing is in neutral position, a starting mechanism, and means for setting said mechanism in operation adapted to be actuated with the movement of said bolt, and means for locking said bolt in position after it is engaged in said slots and before it has caused the mechanism to be set in operation.

4. The combination of a change-speed-gearing having two parts provided with slots, a reciprocating part adapted to engage in said slots, to hold the change-speed-gearing in neutral position, a starting mechanism, and means for setting said starting mechanism in operation adapted to be engaged by said reciprocating part.

5. The combination of a change-speed-gearing having two parts provided with slots, a reciprocating part adapted to engage in said slots to hold the change-speedgearing in neutral position, a starting mechanism, means for setting said starting mechanism in operation adapted to be engaged by said reciprocating part, said reciprocating part being adapted to slide in a socket, said socket being provided with an aperture, said reciprocating part being provided with a groove adapted to register with said aperture, and an engaging part extending into said slot and said aperture for the purpose described.

In testimony whereof, I sign this specification.

HORACE T. THOMAS.